US012684415B2

(12) United States Patent
Bergström et al.

(10) Patent No.: US 12,684,415 B2
(45) Date of Patent: Jul. 14, 2026

(54) RADIO NETWORK NODE, USER EQUIPMENT, AND METHODS PERFORMED THEREIN

(71) Applicant: Telefonaktiebolaget LM Ericsson (publ), Stockholm (SE)

(72) Inventors: Mattias Bergström, Sollentuna (SE); Antonino Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 311 days.

(21) Appl. No.: 18/257,387

(22) PCT Filed: Dec. 14, 2021

(86) PCT No.: PCT/SE2021/051254
§ 371 (c)(1),
(2) Date: Jun. 14, 2023

(87) PCT Pub. No.: WO2022/132009
PCT Pub. Date: Jun. 23, 2022

(65) Prior Publication Data
US 2024/0022958 A1      Jan. 18, 2024

Related U.S. Application Data

(60) Provisional application No. 63/127,182, filed on Dec. 18, 2020.

(51) Int. Cl.
*H04W 28/06*      (2009.01)
*H04W 8/24*       (2009.01)

(52) U.S. Cl.
CPC ........... *H04W 28/065* (2013.01); *H04W 8/24* (2013.01)

(58) Field of Classification Search
CPC ...... H04W 28/065; H04W 8/24; H04W 76/15
See application file for complete search history.

(56) References Cited

U.S. PATENT DOCUMENTS

| | | | |
|---|---|---|---|
| 2015/0304838 A1* | 10/2015 | Kanamarlapudi ...... | H04W 8/24 |
| | | | 455/422.1 |
| 2020/0146093 A1* | 5/2020 | Zhang ................... | H04L 5/0053 |

(Continued)

OTHER PUBLICATIONS

3GPP , "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Mar. 2020, 1-1048.

(Continued)

*Primary Examiner* — Schquita D Goodwin
(74) *Attorney, Agent, or Firm* — Murphy, Bilak & Homiller, PLLC

(57) ABSTRACT

A radio network node, a UE, and methods performed therein are provided. A method performed by a UE (10), for handling communication in a wireless communications network, comprises transmitting, to a radio network node (12), one or more indications indicating, explicitly or implicitly, a processing time for handling segments of an RRC message. The UE determines the processing time for handling the segments of the RRC message. The radio network node (12) obtains the one or more indications from the UE (10) or another network node, and determines the processing time for handling the segments of the RRC message at the UE (10) based on the one or more indications.

16 Claims, 10 Drawing Sheets

(56)     References Cited

U.S. PATENT DOCUMENTS

| | | | | |
|---|---|---|---|---|
| 2020/0196376 | A1* | 6/2020 | Kim | H04L 69/22 |
| 2020/0213994 | A1* | 7/2020 | Feng | H04W 72/51 |
| 2021/0037559 | A1* | 2/2021 | Hande | H04W 72/21 |
| 2021/0044962 | A1* | 2/2021 | Li | H04B 7/0413 |
| 2021/0058890 | A1* | 2/2021 | Akkarakaran | G01S 5/0221 |
| 2021/0345157 | A1* | 11/2021 | Ke | H04L 47/283 |
| 2023/0025829 | A1* | 1/2023 | Jin | H04L 69/325 |
| 2023/0087902 | A1* | 3/2023 | Zheng | H04W 8/24 |
| | | | | 370/329 |
| 2023/0199811 | A1* | 6/2023 | Liang | H04W 72/51 |
| | | | | 370/329 |

OTHER PUBLICATIONS

3GPP , "3rd Generation Partnership Project; Technical Specification Group Radio Access Network; NR and Evolved Universal Terrestrial Radio Access (E-UTRA); Study on optimizations of UE radio capability signalling; (Release 16)", 3GPP TR 37.873 V16.0.0, 2019-03.

3GPP , "3rd Generation Partnership Project; Technical Specification Group Radio Access Network; NR; Radio Resource Control (RRC) protocol specification (Release 16)", 3GPP TS 38.331 V16.0.0, Mar. 2020, 1-835.

3GPP , "3rd Generation Partnership Project; Technical Specification Group Radio Access Network; NR; Radio Resource Control (RRC) protocol specification (Release 16)", 3GPP TS 38.331 V16.2.0, Sep. 2020, 1-921.

Unknown, Author , "Conditional handover requirement for NR", 3GPP TSG-RAN WG4 Meeting #92bis, R4-1912043, Chongqing, China, Oct. 14-18, 2019, 1-5.

Unknown, Author , "Maximum processing time for RRC Segmentation", 3GPP TSG-RAN WG2 #108, Tdoc R2-1915758 (Revision of R2-1912831), Reno, USA, Nov. 18-22, 2019, 1-3.

Unknown, Author , "Remaining issues for RRC Segmentation", 3GPP TSG-RAN WG2 #107bis, Tdoc R2-1912831, Chongqing, China, Oct. 14-18, 2019, 1-4.

Unknown, Author , "Remaining issues on UE capability segmentation", 3GPP TSG-RAN2 Meeting #108, R2-1915266 (Update of R2-1912407), Reno, Nevada, US, Nov. 18-22, 2019, 1-4.

BGPP , "3rd Generation Partnership Project; Technical Specification Group Radio Access Network; NR; Radio Resource Control (RRC) protocol specification (Release 16)", 3GPP TS 38.331 V16.0.0, Mar. 2020, 1-835.

3GPP , "3rd Generation Partnership Project; Technical Specification Group Radio Access Network; NR; Radio Resource Control (RRC) protocol specification (Release 16)", 3GPP TS 38.331 V16.6.0, Sep. 2021, 1-961.

* cited by examiner

RADIO NETWORK NODE, USER EQUIPMENT, AND METHODS PERFORMED THEREIN

TECHNICAL FIELD

Embodiments herein relate to a radio network node, a user equipment (UE), and methods performed therein regarding wireless communication. Furthermore, a computer program product and a computer-readable storage medium are also provided herein. In particular, embodiments herein relate to handling communication, such as handling or controlling message- or packet-segmentation, in a wireless communications network.

BACKGROUND

In a typical wireless communications network, UEs, also known as wireless communication devices, mobile stations, stations (STA) and/or wireless devices, communicate via a Radio Access Network (RAN) with one or more core networks (CN). The RAN covers a geographical area which is divided into service areas or cells, with each service area or cell being served by a radio network node such as an access node, e.g., a Wi-Fi access point or a radio base station (RBS), which in some networks may also be called, for example, a NodeB, a gNodeB, or an eNodeB. The service area or cell is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and investigate e.g. enhanced data rate and radio capacity. In some RANs, e.g.

as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and coming 3GPP releases, such as New Radio (NR), are worked on. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements may be of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Segmentation of radio resource control (RRC) messages is being introduced for 3GPP Release 16. This is needed to support transmitting large RRC messages that exceed the Packet Data Convergence Protocol service data unit (PDCP SDU) size limit, which is 9000 bytes for NR and 8188 bytes for LTE [3GPP TS 37.873 v.16.0.0]. Other radio access technologies (RAT) may have other limits.

It is expected that RRC messages sent in DL and containing UE configurations which may also exceed the above limits.

The segmented RRC messages are sent in the RRC messages denoted as DLDedicatedMessageSegment and ULDedicatedMessageSegment, see below an extract of the latest change requests (CR) on the RRC specification TS 38.331 v.16.0.0.

```
-  DLDedicatedMessageSegment
The DLDedicatedMessageSegment message is used to transfer one segment of
the RRCConnectionResume or RRCConnectionReconfiguration messages.
Signalling radio bearer: SRB1
RLC-SAP: AM
Logical channel: downlink control channel (DCCH)
Direction: Network to UE
DLDedicatedMessageSegment message
-- ASN1START
DLDedicatedMessageSegment-r16 ::=                    SEQUENCE {
    criticalExtensions                               CHOICE {
        dlDedicatedMessageSegment-r16
    DLDedicatedMessageSegment-r16-IEs,
        criticalExtensionsFuture                     SEQUENCE { }
    }
}
DLDedicatedMessageSegment-r16-IEs ::= SEQUENCE {
    segmentNumber-r16                                INTEGER
(0..4),
        rrc-MessageSegmentContainer-r16             OCTET STRING,
        rrc-MessageSegmentType-r16                  ENUMERATED
{notLastSegment, lastSegment},
        lateNonCriticalExtensions                   OCTET STRING
```

3
4

-continued

```
    OPTIONAL,
  nonCriticalExtension                    SEQUENCE { }
       OPTIONAL
  }
  -- ASN1STOP
```

| DLDedicatedMessageSegment field descriptions |
| --- |
| segmentNumber<br>Identifies the sequence number of a segment within the encoded DL<br>DCCH message. The network transmits the segments with continuously<br>increasing segmentNumber order so that the UE's RRC layer may<br>expect to obtain them from lower layers in the correct order. Hence,<br>the UE is not required to perform segment re-ordering on RRC level.<br>rrc-MessageSegmentContainer<br>Includes a segment of the encoded DL DCCH message. The size of the<br>included segment in this container should be small enough so the resulting<br>encoded RRC message PDU is less than or equal to the PDCP<br>SDU size limit.<br>rrc-MessageSegmentType<br>Indicates whether the included DL DCCH message segment is the<br>last segment of the message or not. |

The UE processing time for RRC messages is hardcoded in the specification. For the RRCReconfiguration message, for example, is 16 milliseconds in NR and this may not be enough for processing a large RRC message.

SUMMARY

An object herein is to provide a mechanism to handle messages in an efficient and improved manner in the wireless communications network.

According to an aspect the object is achieved, according to embodiments herein, by providing a method performed by a UE for handling communication in a wireless communications network. The UE transmits one or more indications to a radio network node, indicating, explicitly or implicitly, a processing time for handling segments of an RRC message.

According to an aspect the object is achieved, according to embodiments herein, by providing a method performed by a radio network node for handling communication in a wireless communications network. The radio network node obtains one or more indications, from a UE, indicating, explicitly or implicitly, a processing time for handling segments of an RRC message at the UE, such as a processing time for handling a segmented RRC message for the UE. The radio network node further determines the processing time for handling the segments of the RRC message at the UE based on the one or more indications. Thus, the radio network node may determine the processing time for handling segmented RRC messages at the UE based on the obtained one or more indications. The radio network node may then handle one or more RRC messages or resources related to the one or more RRC messages for the UE based on the determined processing time.

According to an aspect the object is achieved, according to embodiments herein, by providing a UE and a radio network node configured to perform the methods herein, respectively.

Thus, it is herein provided a UE for handling communication in a wireless communications network. The UE is configured to transmit one or more indications to a radio network node, indicating, explicitly or implicitly, a processing time for handling segments of an RRC message.

Furthermore, it is herein provided a radio network node for handling communication in a wireless communications network. The radio network node is configured to obtain one or more indications, from a UE, indicating, explicitly or implicitly, a processing time for handling segments of an RRC message at the UE. The radio network node is further configured to determine the processing time for handling the segments of the RRC message at the UE based on the one or more indications.

It is furthermore provided herein a computer program product comprising instructions, which, when executed on at least one processor, cause the at least one processor to carry out the method above, as performed by the UE or the radio network node, respectively. It is additionally provided herein a computer-readable storage medium having stored thereon a computer program product comprising instructions which, when executed on at least one processor, cause the at least one processor to carry out the method according to the method above, as performed by the UE or the radio network node, respectively.

The UE processing time for a RRCReconfiguration message is, e.g., 16 milliseconds, as stated above. That may be a too short time considering that with RRC segmentation, the RRCReconfiguration messages can become so large that the processing time might not be enough. The UE processing time for the RRCReconfiguration message may be extended. For example, by using the following formula:

$$\text{Processing time}=16+Y+(N\text{seg}-1)^*X$$

where:
Nseg is the number of segments
Y is a value.
X is a value.

It is being discussed in 3GPP RAN2 which values X and Y should have. Example values are Y=10 milliseconds and X=16 milliseconds.

If X and Y becomes too large, the UE processing time may become large which increases processing time. In turn it would delay the use of features which should be configured in, e.g., a RRCReconfiguration message such as transmissions or receptions.

If X and Y becomes too short, it may put too strict requirements on the UE and hence would increase complexity and cost of UEs.

Embodiments herein disclose a solution where the UE can provide one or more indications to the radio network node so that the radio network node can determine the processing time for this particular UE. With prior art, the network will have to assume the worst case for a UE, i.e., even if a UE is powerful and would be capable of processing RRC messages quicker than required, the network would have to assume that this UE is as slow as the minimum requirement. If 3GPP RAN2 decides that X and Y are large, then the network would have to assume that all UEs apply those (large) values, which would lead to a delay when, e.g., allocating resources for the UE.

Embodiments herein allow UEs which have high processing power to indicate a short processing time, while a less powerful UE to indicate a long processing time, thereby enabling an efficient use of resources when communicating in the wireless communication network.

BRIEF DESCRIPTION OF THE DRAWINGS

Embodiments will now be described in more detail in relation to the enclosed drawings, in which.

DETAILED DESCRIPTION

Figure 1:
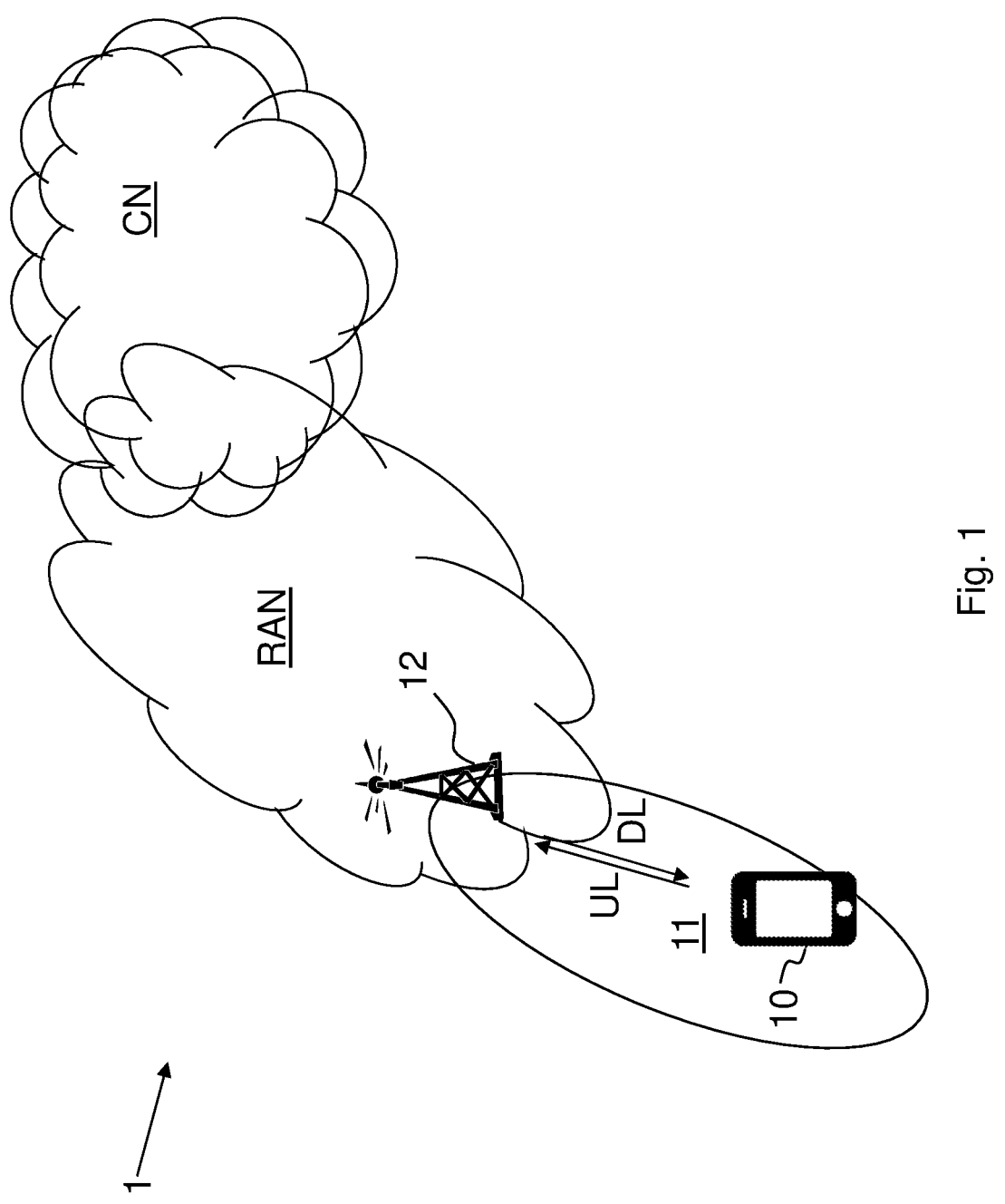
FIG. 1 shows an overview depicting a wireless communications network according to embodiments herein.

Embodiments herein relate to wireless communications networks in general. FIG. 1 is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a user equipment (UE) 10 exemplified herein as a wireless device such as a mobile station, a non-access point (non-AP) station (STA), a STA and/or a wireless terminal, is comprised communicating via e.g. one or more Access Networks (AN), e.g. radio access network (RAN), to one or more core networks (CN). It should be understood by the skilled in the art that "UE" is a non-limiting term which means any terminal, wireless communications terminal, user equipment, narrowband internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a first radio network node 12 providing radio coverage over a geographical area, a first service area 11 or first cell, of a first radio access technology (RAT), such as NR, LTE, or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a standalone access point or any other network unit or node capable of communicating with a wireless device within the area served by the radio network node depending e.g. on the first radio access technology and terminology used.

The first radio network node may be referred to as the radio network node 12 or a serving radio network node wherein the service area may be referred to as a serving cell, and the serving radio network node communicates with the UE 10 in form of DL transmissions to the UE 10 and UL transmissions from the UE 10. It should be noted that a service area may be denoted as cell, beam, beam group or similar to define an area of radio coverage. It should also be noted that the first radio network node 12 may be a core network node handling communication in the wireless communications network.

According to embodiments herein the UE 10 transmits to the radio network node 12, one or more indications for indicating, explicitly or implicitly, a processing time for handling segments of an RRC message also referred to as a segmented RRC message. The radio network node 12 receives the one or more indications from the UE 10 and determines the processing time for the UE. The radio network node may then consider this processing time when it provides the segments of the RRC message for the UE 10, or resources related to the RRC message such as scheduling, e.g., time and/or frequencies, related to RRC messages based on the processing time. The one or more indications may be comprised in UE capability signalling or similar. In NR, different UE models may support different features and functions. In order to ensure that the network can configure each UE in accordance with its capabilities, the network needs to be informed the radio access capabilities of each UE. The radio network node 12 such as a gNB has means to request the UE 10 for radio network related capability information from the UE 10. The signalling mechanism and structure is defined in the RRC protocol. In order to avoid uploading UE capabilities over the radio interface between the UE 10 and the radio network node 12 each time the UE 10 performs a transition to RRC connected state, i.e., when the UE specific context is created in the radio network node 12, the radio network node 12 may upload the UE capability information to the core network so that it can be stored there when the UE 10 is in RRC idle state. When the UE 10 connects later to the same or a different radio network node, the radio network node 12 may ask the core network whether it has a stored copy of the UE capabilities. If so, the core network provides the UE-capabilities to the radio network node 12. This mechanism reduces the signalling over the radio interface, i.e., signalling between the UE 10 and the radio network node 12. If the core network does not have capabilities, the radio network node 12 requests capabilities from the UE 10. The UE 10 may then provide the one or more indications upon the request. Thus, embodiments allow UEs which have high processing power to indicate a short processing time, while a less powerful UE to indicate a long processing time, thereby enabling an efficient use of resources when communicating in the wireless communication network.

Figure 2:
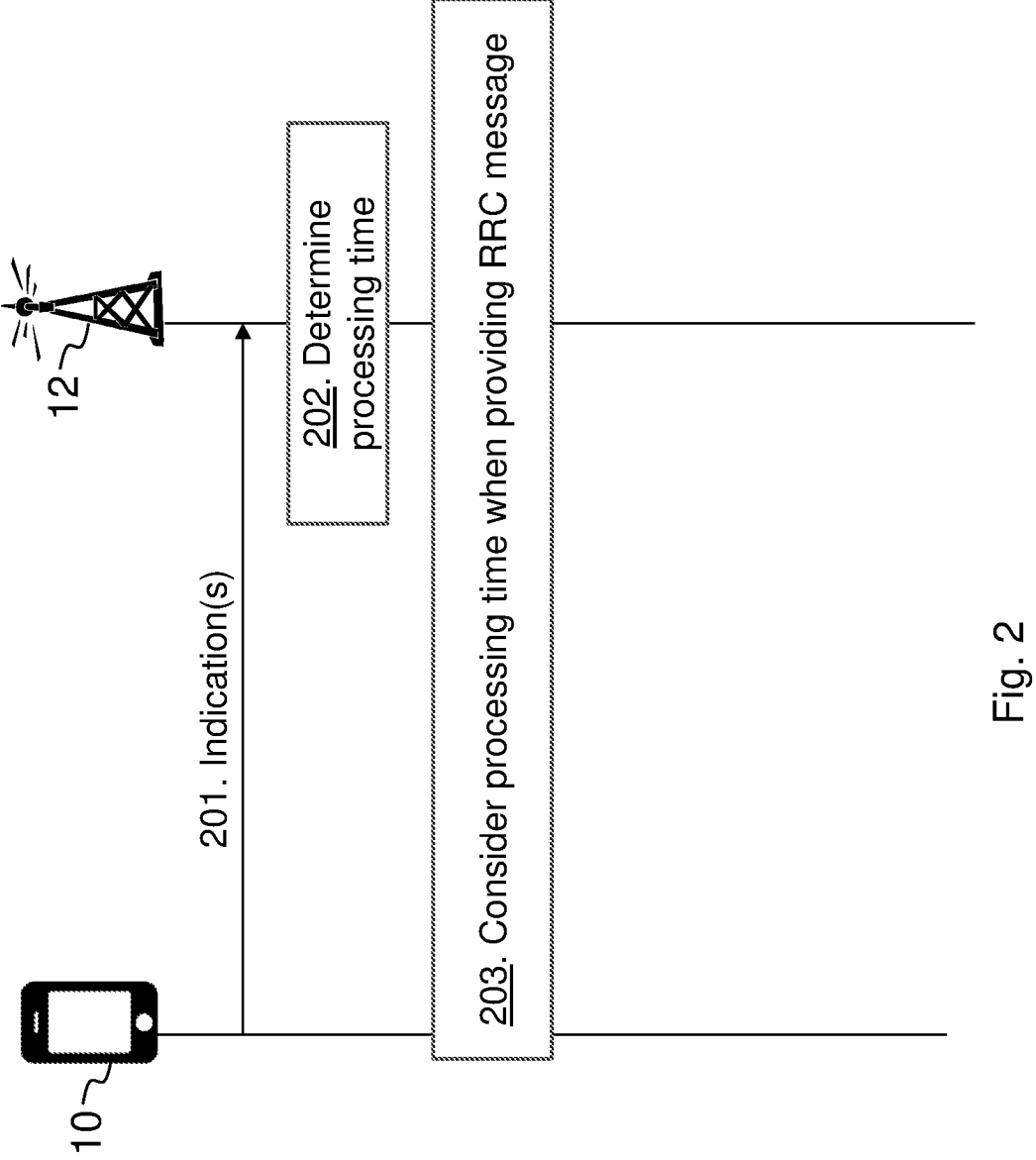
FIG. 2 shows a combined signalling scheme and flowchart depicting embodiments herein.

FIG. 2 is a combined signalling scheme and flowchart depicting embodiments herein.

Action 201. The UE 10 transmits one or more indications to the radio network node 12. The one or more indications indicate, explicitly or implicitly, the processing time at the UE 10 for handling the segments of the RRC message. Thus, the UE 10 may indicate to a network one or more parameters which can be used to determine the processing time for segmented RRC messages. These one or more parameters may be referred to as processing time indications. It should be noted that the radio network node 12 may be a core network node in case processing time is determined at or retrieved from a core network node.

The one or more indications may directly or explicitly indicate the processing time of the UE. For example, the one or more indications may explicitly indicate the processing time of the UE such as a time T. Another approach is that the UE 10 indirectly or implicitly indicates the processing time of the UE 10 to the radio network node 12 by providing an indication which can be used by the radio network node 12 to determine the processing time of the UE 10. This may, for example, be used if the processing time can be determined based on a formula and in which case the UE 10 may provide input parameters to the radio network node 12 which can be used as input to the formula.

An example formula which may be applied to determine the processing time for an RRC message, is:

$$\text{Processing time} = 16 + Y + (N\text{seg} - 1)^* X$$

where:

Nseg is the number of segments.

Y is a value which for example would cater at least for the concatenation of the received segments before the UE can process the message that was segmented.

X is a value which for example would cater for additional processing delay the UE needs in order to process one additional segment of a larger RRC message.

The UE 10 may then indicate the value X, or values X and Y which the radio network node 12 can use to determine the processing time of the UE.

Note: The above formula is just one example formula for determining processing time. Embodiments herein may apply to other formulas as well, i.e., the indications may relate to other parameters of a different formula for determining processing time of segmented RRC messages at the UE 10.

The one or more indications may be transmitted to the radio network node 12 by capability signalling, and/or in UE assistance information. It should be noted that a combination of signalling approaches is possible, e.g., the UE 10 may be able to indicate processing time related values in UE capabilities and also indicate such values in UE assistance information. If both are possible, there may be a priority or hierarchy between these, for example, that the values indicated using UE assistance information takes precedence over the values indicated in UE capabilities.

Thus, the UE 10 may send one or more indications to the radio network node 12 in UE capability signalling. The UE 10 may send the one or more indications to the radio network node 12 upon request from the radio network node 12.

An example implementation of embodiments herein is shown below. It is shown an excerpt of the UE capability section of 3GPP TS 38.331 v16.2.0 specification. The changes used to implement the above is shown with bold text and underlined. As can be seen, a new field dl-SegmentationProcessingTime-r16 is added which has the type DL-SegmentationProcessingTime-r16. That type carries a field with name valueX-r16 and a field with valueY-r16, i.e., examples of the indications. The UE sets these fields to the corresponding values, as described above.

```
UE-NR-Capability-v1610 ::=              SEQUENCE {
    inDeviceCoexInd-r16                 ENUMERATED {supported}          OPTIONAL,
    dl-DedicatedMessageSegmentation-r16        ENUMERATED {supported}
OPTIONAL,
    nrdc-Parameters-v1610               NRDC-Parameters-v1610          OPTIONAL,
    powSav-Parameters-r16               PowSav-Parameters-r16          OPTIONAL,
    fr1-Add-UE-NR-Capabilities-v1610           UE-NR-CapabilityAddFRX-Mode-v1610
OPTIONAL,
    fr2-Add-UE-NR-Capabilities-v1610           UE-NR-CapabilityAddFRX-Mode-v1610
OPTIONAL,
    bh-RLF-Indication-r16               ENUMERATED {supported}         OPTIONAL,
    directSN-AdditionFirstRRC-IAB-r16          ENUMERATED {supported}
OPTIONAL,
    bap-Parameters-r16                  BAP-Parameters-r16            OPTIONAL,
    referenceTimeProvision-r16              ENUMERATED {supported}           OPTIONAL,
    sidelinkParameters-r16              SidelinkParameters-r16        OPTIONAL,
    highSpeedParameters-r16                 HighSpeedParameters-r16           OPTIONAL,
    mac-Parameters-v1610                    MAC-Parameters-v1610              OPTIONAL,
    mcgRLF-RecoveryViaSCG-r16               ENUMERATED {supported}
OPTIONAL,
    resumeWithStoredMCG-SCells-r16              ENUMERATED {supported}
OPTIONAL,
    resumeWithStoredSCG-r16                 ENUMERATED {supported}           OPTIONAL,
    resumeWithSCG-Config-r16                ENUMERATED {supported}           OPTIONAL,
    ue-BasedPerfMeas-Parameters-r16             UE-BasedPerfMeas-Parameters-r16
OPTIONAL,
    son-Parameters-r16                  SON-Parameters-r16            OPTIONAL,
    onDemandSIB-Connected-r16               ENUMERATED {supported}
```

-continued

```
OPTIONAL,
    nonCriticalExtension              UE-NR-Capability-v16xy          OPTIONAL
}
UE-NR-Capability-v1610 ::=            SEQUENCE {
    dl-SegmentationProcessingTime-r16        DL-SegmentationProcessingTime-r16
OPTIONAL,
    nonCriticalExtension     SEQUENCE { }                  OPTIONAL
}
DL-SegmentationProcessingTime-r16 ::=     SEQUENCE {
        valueX-r16                       INTEGER(0..20)
        valueY-r16                       INTEGER(0..10)
}
```

It should be noted that the UE 10 may send the UE capability signalling to the radio network node 12, e.g., a gNB, upon request. When the UE 10 connects to radio network node 12, the radio network node 12 may however not need to request the UE capabilities from the UE 10 since the radio network node 12 may get UE capabilities from another node, for example an Access and Mobility Management Function (AMF) node in the core network or from another radio network node.

In case the processing time of the UE 10 changes, for example, due to that the UE 10 has more available processing capacity, the UE 10 may provide other processing time indications to the radio network node 12. However, the UE 10 may only do so under certain circumstances, for example, if the UE 10 receives a new request from the radio network node 12 to provide the UE capabilities and has an updated processing time. Thus, if the UE 10 has updated values, the UE 10 may wait until the radio network node 12 requests for UE capabilities and then the UE 10 may provide them to the radio network node 12. In current NR specifications, the UE 10 is not allowed to change the UE capability information if the UE 10 is in RRC CONNECTED state or in RRC INACTIVE state, but the UE 10 is instead allowed to change the UE capability information if the UE is in RRC IDLE or if the UE 10 is detached from the network.

A further alternative is for the UE 10 to indicate the supported value or values via the UE assistance information procedure, i.e., by transmitting the one or more indications using the UEAssistanceInformation message. In such a case, if the UE 10 does not indicate any supported values for the processing delay requirements of the RRC segmentation procedure, the network assumes a worst-case scenario, and thus the worst processing delay requirements, in order to not incur in any problem during transmission and reception operations. However, if the UE 10 at a certain point wants to provide other processing time indications to the network, because it has a better processing capability, for instance, the UE 10 may indicate the new value via the UEAssistanceInformation message. One reason why the UE's processing time may vary is that the UE's processing power may be used for other purposes as well.

Once the radio network node 12 receives the new one or more values or indications, the radio network node 12 can either continue to assume the worst-case processing delay requirements, or the radio network nod 12 can assume that the UE 10 is using the new one or more values just signalled. Implementation example is shown below in bold and underlined text.

```
UEAssistanceInformation-v1610-IEs ::= SEQUENCE {
    idc-Assistance-r16               IDC-Assistance-r16                OPTIONAL,
    drx-Preference-r16               DRX-Preference-r16                OPTIONAL,
    maxBW-Preference-r16                MaxBW-Preference-r16               OPTIONAL,
    maxCC-Preference-r16                MaxCC-Preference-r16               OPTIONAL,
    maxMIMO-LayerPreference-r16            MaxMIMO-LayerPreference-r16          OPTIONAL,
    minSchedulingOffsetPreference-r16         MinSchedulingOffsetPreference-r16       OPTIONAL,
    releasePreference-r16            ReleasePreference-r16             OPTIONAL,
    sl-UE-AssistanceInformationNR-r16          SL-UE-AssistanceInformationNR-r16
OPTIONAL,
    referenceTimeInfoPreference-r16         BOOLEAN                     OPTIONAL,
    nonCriticalExtension             UEAssistanceInformation-v16xy-IEs   OPTIONAL
}
UEAssistanceInformation-v16xy-IEs ::= SEQUENCE {
    dl-SegmentationProcessingTime-r16      DL-SegmentationProcessingTime-r16
OPTIONAL
}
DL-SegmentationProcessingTime-r16 ::=          SEQUENCE {
            valueX-r16                       INTEGER(0..20)
            valueY-r16                       INTEGER(0..10)
}
```

As described previously, using the UE capability signalling is one option for allowing the UE 10 to indicate the supported value or values for the processing time of the RRC segmentation. The UE 10 may, thus, send the one or more values upon a network request and the one or more values may not be changed by the UE 10 while in RRC_CONNECTED or RRC_INACTIVE.

Action 202. The radio network node 12 receives the one or more indications from the UE 10 (or another network node) and determines the processing time for handling RRC message at the UE 10 based on the one or more indications. The radio network node 12 may, e.g., determine or calculate the processing time based on values indicated by the one or more indications. Thus, the radio network node 12 may receive the one or more indications from the UE 10 and may determine the processing time for the UE 10 based on the indication or indications.

Action 203. The radio network node 12 may consider the determined processing time when the radio network node 12 provides segmented RRC messages for the UE 10. 'Considering the processing time' means, for example, that the radio network node 12 may assume that the UE 10 will, in response to sending an RRC message to the UE, have applied the RRC message after the processing time. And in case a response message is triggered in response to applying the RRC message, the radio network node 12 may provide transmission resources for the UE 10 such that the UE 10 can send the response message. For example, if the radio network node 12 sends an RRCReconfiguration message to the UE 10, the UE 10 will apply the reconfiguration and respond with a RRCReconfigurationComplete message. The processing time is defined such that it starts when the UE 10 has received the RRC message, i.e., a last segment of the RRC message, and the processing time ends at the time when the UE 10 is ready to receive a grant to send the complete message. Hence, the radio network node 12 may provide a grant to the UE 10 in time so that the UE 10 may send the RRCReconfigurationComplete message at the end of the processing time, or later if for example the network is busy or does not have resources available at the moment.

The radio network node 12 may assume a default processing time for the UE 10. For example, in situations where the radio network node 12 does not have information about what the processing time of the UE 10 is, or in case the network is not configured to considered UE signalled UE processing time values. The default processing time may be a large value, for example the largest value allowed by a specification. The radio network node 12 may determine this default processing time by assuming values for the one or more indications which the UE 10 would send to the network in case the UE 10 would provide the one or more indications to the network. For example, in the above, it was described how the UE 10 indicated a value X and a value Y to the radio network node 12. The radio network node 12 may assume a certain value X_default and a value Y_default in case the radio network node 12 has not obtained an indication of what the values X and Y are for the UE 10.

If the radio network node 12 receives another indication that the UE 10 is able to support different processing delay requirements for the same RRC procedure, the radio network node 12 may assume that the UE 10 will use one of those supported, probably the longest or the latest, to process the segmented RRC message, which means that the radio network node 12 can wait the supported processing time and then send a grant to the UE 10 after it has sent the segmented RRC-message. Alternatively, the radio network node 12 may also indicate to the UE 10 a relaxation of the processing delay requirements for a given RRC procedure. In this case relaxation means that either a larger processing delay requirement can be used, or that there are no processing delay requirements at all. This may happen when the network is highly loaded and the processing capability is not enough to handle all the RRC messages received or sent.

Figure 3:
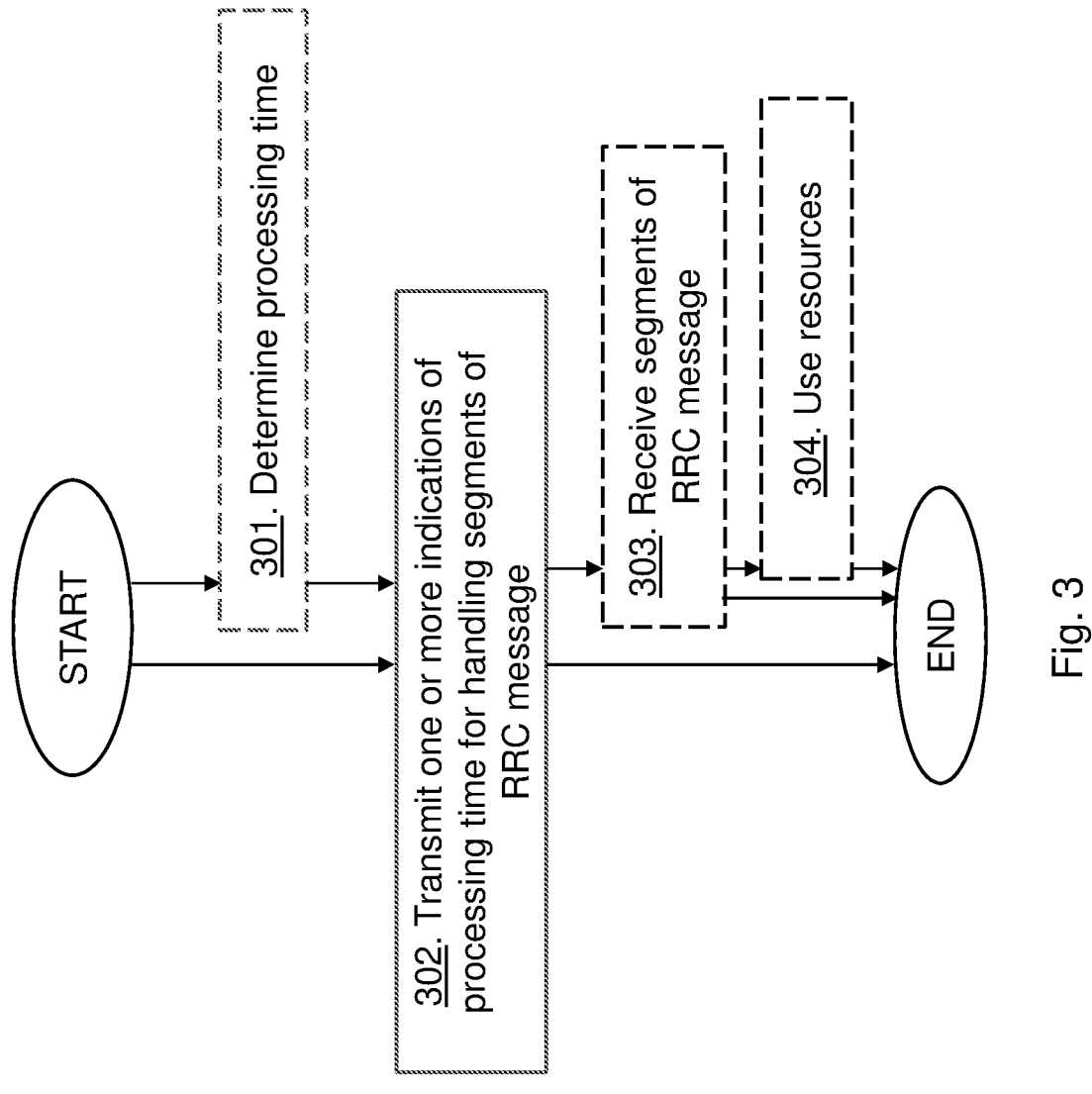
FIG. 3 shows a flowchart depicting a method performed by a UE according to embodiments herein.

The method actions performed by the UE 10 for handling communication in the wireless communications network according to embodiments will now be described with reference to a flowchart depicted in FIG. 3. The actions do not have to be taken in the order stated below, but may be taken in any suitable order. Dashed boxes indicate optional features.

Action 301. The UE 10 may determine a processing time for handling segments of an RRC message. The processing time may be based on a minimum possible number of segments to send the RRC message, or based on a size of the RRC message. The UE 10 may thus determine its processing time for handling segmented RRC messages, and this may be hard configured or according to a formula or measured as the UE 10. The UE 10 may determine the one or more indications, e.g., one or more parameter values such as X and Y.

Assuming Nseg is the minimum possible number of segments.

There may be maximum possible size of each segment. In NR specification this value is 9 kilobytes since there is a limitation in the size of RRC message stemming from a limitation in the PDCP layer, namely, PDCP can handle higher layer messages of size 9 kilobytes.

In one embodiment, the UE 10 assumes that Nseg is the minimum possible number of segments which would be required to send the message. The UE 10 then uses this assumed minimum possible value when it determines the processing time.

For example, if the network should send a message of size 10 kilobytes, it would be possible to send this message using two segments. However, the radio network node 12 may segment the message in to three or more segments. Potential reasons why the radio network node 12 would do this could for example be due to memory restrictions in the network. So the 10 kilobyte message may be segmented in to three segments, e.g., segment 1 of 4 kilobytes, segment 2 of 4 kilobytes, and segment 3 of 2 kilobytes. According to this embodiment, the UE would however determine that the minimum possible would be two.

Another possible way of implementing this is to apply a processing time which depends on the size of the message, for example:

$$\text{Processing time} = 16 + Y + \text{floor}(\text{Size of message}/\text{Maximum size of a segment}) * X$$

Action 302. The UE 10 transmits to the radio network node 12, the one or more indications indicating, explicitly or implicitly, the processing time for handling segments of the RRC message. The one or more indications may explicitly indicate the processing time of the UE, such as, e.g., a time T. The UE 10 may indirectly or implicitly indicate the processing time of the UE 10 to the network, e.g., to the radio network node 12, by providing an indication which can be used by the network to determine the processing time of the UE. For example, the UE processing time may be determined based on a formula, in which case the UE 10 may provide input parameters to the radio network node 12 which can be used as input to the formula. The one or more indications may indicate a value to process one additional segment of a segmented RRC message. The one or more indications may indicate one or more supported values for the processing delay requirements of the RRC segmentation procedure.

The UE 10 thus transmits the one or more indications to the radio network node 12, indicating the processing time for handling RRC messages, such as receiving, joining and processing the segments. The indications may define a value, e.g., a time value, or parameters used to determine the processing time. The one or more indications may comprise one or more values or parameters for determining the processing time. For example, the one or more indications may comprise one or more values of one or more parameters for determining the processing time. The one or more indications may comprise a respective value or parameter for a respective radio access technology used or a respective dual connectivity option used. The one or more indications may indicate a first processing time indication for the wireless communications network, independently of one or more indications for a second processing time indication for another wireless communications network. Thus, for example, in a multi-Subscriber Identity Module (SIM) scenario, the UE 10 may indicate one value for one network and another value to another network. The UE may further transmit another indication indicating that the UE 10 is able to support different processing delay requirements.

The one or more indications may be transmitted using UE capability signalling and/or as UE assistance information. The one or more indications may thus be transmitted using UE capability signalling, which UE capability signalling may be used by the UE 10 to indicate supported value(s) for the processing time of the RRC segmentation. The supported value may be a value for a processing delay requirement.

In some embodiments, one or more values indicated using the UE assistance information take precedence over one or more values indicated using the UE capability signalling.

As discussed above, the UE 10 may send the UE capability signalling to the radio network node 12, e.g., a gNB, upon request. The UE 10 may send supported value(s) for the processing time of the RRC segmentation upon a network request.

In some embodiments, when the UE 10 connects to the radio network node 12, the radio network node 12 may however not need to request the UE capabilities from the UE 10 since the radio network node 12 may get UE capabilities from another node, for example the AMF-node in the core network or from another radio network node.

In case the processing time of the UE 10 changes, for example, due to that the UE has more available processing capacity, the UE 10 may provide other processing time indications to the network. However, the UE 10 may only do so under certain circumstances, for example, if the UE 10 receives a new request from the radio network node 12 to provide the UE capabilities and has an updated processing time. Thus, if the UE 10 has updated values, the UE 10 will wait until the network requests UE capabilities and then the UE may provide them to the network, e.g., to the radio network node 12. In current NR specifications, the UE 10 is not allowed to change the UE capability information if the UE 10 is in RRC CONNECTED state or in RRC INACTIVE state, but the UE 10 is instead allowed to change the UE capability information if the UE 10 is in RRC IDLE or if the UE 10 is detached from the network.

Below are further details which may or may not be included in the one or more indications.

The UE may indicate different values for different RATs. For example, the UE 10 may indicate a first value and a second value for a first RAT such as X_LTE and Y_LTE for an LTE eNB, but another first value and another second value for a second RAT, e.g., value X_NR and value Y_NR for an NR gNB. The UE 10 may send all capabilities to an NR node and values for the LTE may then be forwarded to an LTE node, and vice versa.

Similar to the RAT differentiation, same may apply to the case if a DC option is configured, i.e., E-UTRAN New Radio (EN)-DC, NG-RAN E-UTRA-NR (NGEN)-DC, NR EUTRA (NE)-DC, or NR-DC.

In such a case, the UE 10 may signal a different supported value for each of the DC options. According to this, the UE 10 differentiates the supported values based on the RAT or DC option used, the capability information element, or container, in which this value is signalled may also be different. For LTE, the UE 10 may indicate the value(s) in the UE-EUTRA-Capability IE, i.e., according to TS 36.331 v.16.0.0. For NR, the UE 10 may indicate the value(s) in the UE-NR-Capability IE, i.e., according to TS 38.331 v.16.2.0, and, for DC, the UE 10 may indicate the value(s) in the UE-MRDC-Capability IE, i.e., according to TS 38.331 v.16.2.0.

Note: when it says "if a DC option is configured" it may mean that the RRCReconfiguration message itself indicates that DC should become configured, alternatively it may mean that the UE 10 is already configured with DC and the UE 10 then applies a different processing time.

This embodiment is beneficial since a DC configuration message may contain one part which is to be processed by one RRC processing entity, and another part which is to be processed by another RRC processing entity. These processing entities may have different processing capabilities/power and hence may need different processing times.

The UE 10 may indicate different processing time indications to different networks. For example, if the UE 10 has multiple SIM cards, may they be virtual or physical, the UE 10 may be able to connect to two different operators' networks. The UE 10 may in that case indicate independent indications of processing time to the different networks, e.g., different public land mobile networks.

The UE may transmit another indication that the UE 10 is able to support different processing delay requirements, i.e., support different processing times.

Action 303. The UE 10 may receive the segments of the RRC message. The RRC message may comprise an RRCReconfiguration message.

Action 304. The UE 10 may use resources indicated to transmit or receive data on. The resources may be allocated based on the processing time to handle the segments of the RRC message.

Thus, the UE 10 may receive the segmented RRC message and may use, e.g., resources indicated to transmit or receive data. These resources may have been allocated based on the processing time to handle the RRC message.

Figure 4:
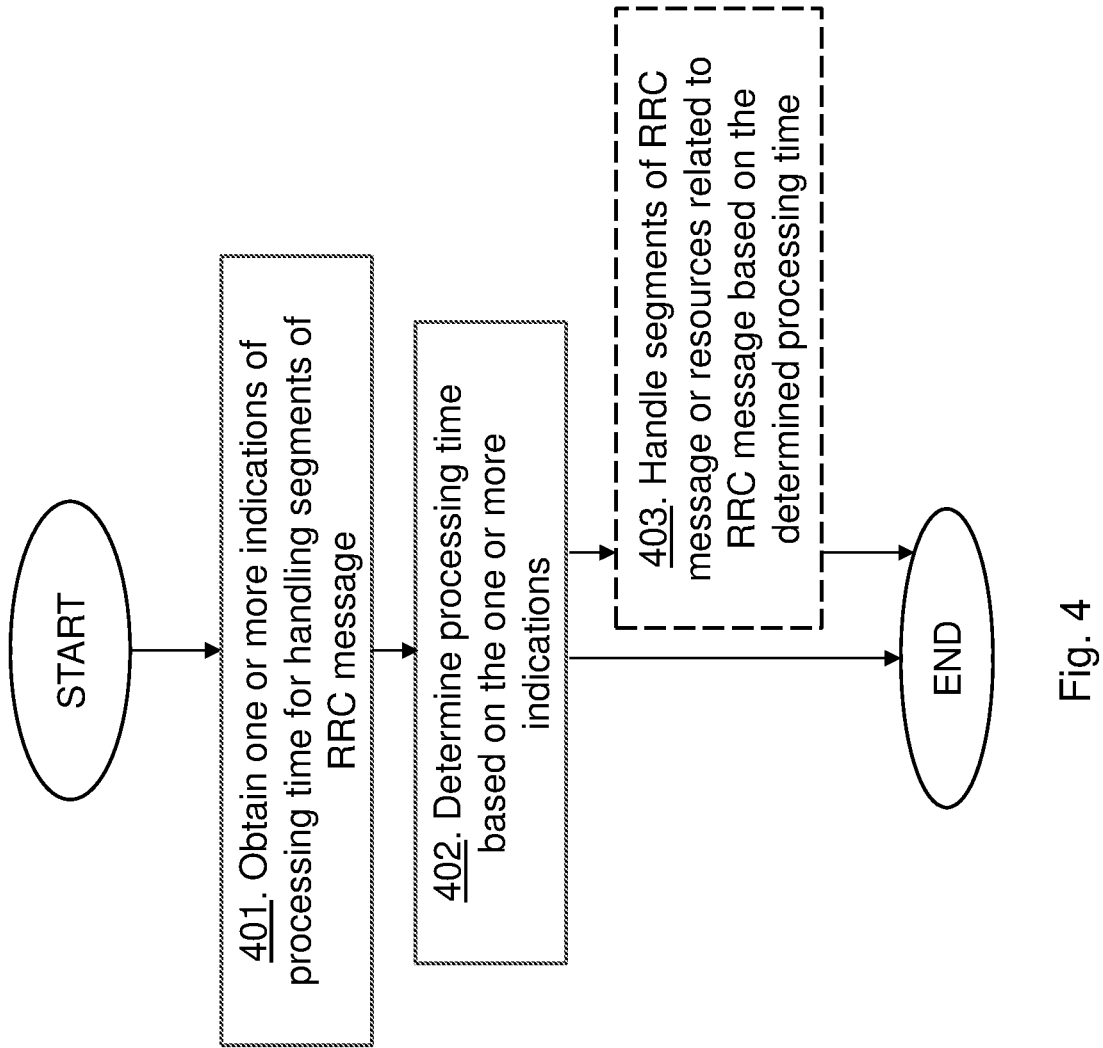
FIG. 4 shows a flowchart depicting a method performed by a radio network node according to embodiments herein.

The method actions performed by the radio network node 12 for handling communication in the wireless communications network according to embodiments will now be described with reference to a flowchart depicted in FIG. 4. The actions do not have to be taken in the order stated below, but may be taken in any suitable order.

Action 401. The radio network node 12 obtains the one or more indications from the UE 10, or another network node, indicating, explicitly or implicitly, the processing time for handling segments of the RRC message at the UE 10. The one or more indications may indicate the value to process one additional segment of the segmented RRC message.

The one or more indications may comprise the one or more values or parameters used to estimate the processing time. The one or more indications may comprise the one or more values of one or more parameters for determining the processing time. The one or more indications may comprise the respective value or parameter for the respective radio access technology used or the respective dual connectivity option used.

The one or more indications may indicate the first processing time indication for the wireless communications network, independently of one or more indications for the second processing time indication for another wireless communications network. For example, the radio network node 12 may obtain different processing time indications for different public land mobile networks.

The one or more indications may define a value, such as a time value, or one or more parameters used to estimate the processing time. The radio network node 12 may obtain different values for different RATs for the UE. The radio network node 12 may obtain a different supported value for each DC option at the UE 10. The radio network node 12 may obtain an independent supported value for each DC option at the UE 10. This embodiment is beneficial since a DC configuration message may contain one part which is to be processed by one RRC processing entity, and another part which is to be processed by another RRC processing entity. These processing entities may have different processing capabilities/power and hence may need different processing times. The radio network node 12 may obtain different indications related to different networks, e.g., different public land mobile networks. The UE 10 may transmit another indication that the UE 10 is able to support different processing delay requirements, i.e., support different processing times. Thus, the radio network node 12 may further receive another indication indicating that the UE 10 is able to support different processing delay requirements. The different processing delay requirements may be, for example, for the same RRC procedure.

Action 402. The radio network node 12 further determines the processing time for handling the segments of the RRC message at the UE 10 based on the one or more indications. The radio network node 12 may, e.g., estimate the processing time based on values indicated by the one or more indications. Thus, the radio network node 12 may receive the X and Y indications from the UE 10 and may determine the processing time for the UE 10 using the X and Y indications.

Action 403. The radio network node 12 may handle segments of the RRC message or may handle resources related to RRC messages based on the determined processing time at the UE 10. For example, the radio network node 12 may handle the resources related to the RRC message, when a response message is triggered in response to applying the RRC message, by providing transmission resources in time so that the UE 10 can send the response at the end of the processing time. Thus, the radio network node 12 may, e.g., assume that the UE 10 will, in response to sending an RRC message to the UE 10, have applied the RRC message after the processing time. And in case a response message is triggered in response to applying the RRC message, the radio network node 12 may provide transmission resources for the UE 10 such that the UE 10 can send the response message. For example, if the radio network node 12 sends an RRCReconfiguration message to the UE 10, the UE 10 will apply the reconfiguration and respond with a RRCReconfigurationComplete message. The processing time is defined such that it starts when the UE 10 has received (the last segment of) the RRC message and it ends at the time when the UE 10 is ready to receive a grant or to send the complete message. Hence, the radio network node 12 may provide a grant to the UE 10 in time so that the UE can send the RRCReconfigurationComplete message at the end of the processing time, or later if for example the network is busy or does not have resources available at the moment.

The radio network node 12 may assume a default processing time for the UE 10. For example, in the above it was described how the UE indicated a value X and a value Y to the network. The radio network node 12 may assume a certain value X_default and a value Y_default in case the radio network node 12 has not obtained an indication of what the values X and Y are for the UE 10.

If the radio network node 12 receives another indication that the UE 10 is able to support different processing delay requirements for the same RRC procedure, the radio network node 12 may assume the UE 10 to use one of those supported. Alternatively, the radio network node 12 may also indicate to the UE 10 a relaxation of the processing delay requirements for a given RRC procedure. In this case relaxation means that either a larger processing delay requirement can be used, or that there are no processing delay requirements at all. This may happen when the network is highly loaded, and the processing capability is not enough to handle all the RRC messages received or sent.

Figure 5:
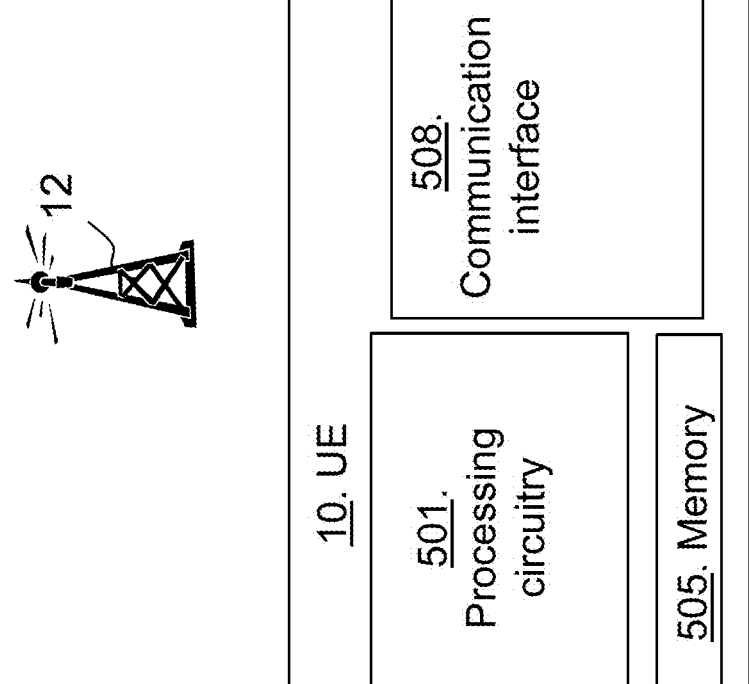
FIG. 5 shows a block diagram depicting embodiments of a UE according to embodiments herein.
Figure 5:
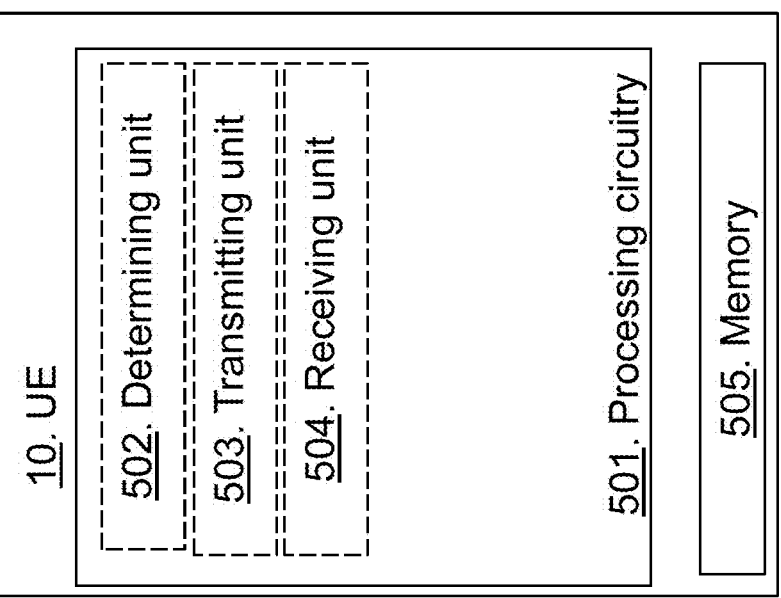

FIG. 5 is a block diagram depicting the UE 10 for handling communication in the wireless communications network 1 according to embodiments herein.

The UE 10 may comprise processing circuitry 501, e.g., one or more processors, configured to perform the methods herein.

The UE 10 may comprise a determining unit 502. The UE 10, the processing circuitry 501 and/or the determining unit 502 may be configured to determine the processing time for handling the segments of the RRC message. The UE 10, the processing circuitry 501 and/or the determining unit 502 may be configured to determine its processing time for handling segmented RRC messages, this may be configured or according to a formula or measured as the UE 10. The UE 10, the processing circuitry 501 and/or the determining unit 502 may be configured to determine the one or more indications e.g., one or more parameter values such as X and Y. The processing time may be based on a minimum possible number of segments to send the RRC message or based on a size of the RRC message. Thus, the UE 10, the processing circuitry 501 and/or the determining unit 502 may be configured to determine the processing time using an assumed minimum or maximum possible number of segments which would be required to send the RRC message. Another possible way of implementing this is to apply a processing time which depends on the size of the message, for example:

$$\text{Processing time}=16+Y+\text{floor}(\text{Size of message/Maximum size of a segment})*X$$

The UE 10 may comprise a transmitting unit 503, e.g., a transmitter or a transceiver. The UE 10, the processing circuitry 501 and/or the transmitting unit 503 is configured to transmit to the radio network node 12, the one or more indications indicating, explicitly or implicitly, a processing time for handling segments of a radio resource control, RRC, message. Handling RRC messages herein means, for example, receiving, joining, and processing the segments of an RRC message. The one or more indications comprise one or more values or parameters for determining the processing time. The one or more indications may comprise one or more values of one or more parameters for determining the processing time. The one or more indications may define a value such as a time value or values for one or more parameters used to estimate the processing time. The one or more indications may indicate a value to process one additional segment of the RRC message. The one or more indications may comprise the respective value or parameter for the respective radio access technology used or a respective dual connectivity option used. The one or more indications may indicate the first processing time indication for the wireless communications network, independently of one or more indications for the second processing time indication for the other wireless communications network. Thus, the one or more indications may define different values for different RATs or different DC options, and/or different networks. The UE 10, the processing circuitry 501 and/or the transmitting unit 503 may be configured to transmit another indication that the UE 10 is able to support different processing delay requirements, i.e., support different processing times. The one or more indications may be transmitted using UE capability signalling and/or as UE assistance information. The one or more values indicated using the UE assistance information may take precedence over one or more values indicated using the UE capability signalling.

The UE 10 may comprise a receiving unit 504, e.g., a receiver or a transceiver. The UE 10, the processing circuitry 801 and/or the receiving unit 504 may be configured to receive the segments of the RRC message, and to use resources indicated to transmit or receive data, wherein the resources are allocated based on the processing time to handle the segments of the RRC message. The RRC message comprises an RRCReconfiguration message.

The UE 10 may comprise a memory 505. The memory 505 comprises one or more units to be used to store data on, such as data packets, processing time, segmented RRC messages, measurements, events and applications to perform the methods disclosed herein when being executed, and similar. Furthermore, the UE 10 may comprise a communication interface 508 such as comprising a transmitter, a receiver, a transceiver and/or one or more antennas.

The methods according to the embodiments described herein for the UE 10 are respectively implemented by means of e.g., a computer program product 506 or a computer program, comprising instructions, i.e., software code portions, which, when executed on at least one processor, cause the at least one processor to carry out the actions described herein, as performed by the UE 10. The computer program product 506 may be stored on a computer-readable storage medium 507, e.g., a disc, a universal serial bus (USB) stick or similar. The computer-readable storage medium 507, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, embodiments herein may disclose a UE 10 for handling communication in a wireless communications network, wherein the UE 10 comprises processing circuitry and a memory, said memory comprising instructions executable by said processing circuitry whereby said UE 10 is operative to perform any of the methods herein.

Figure 6:
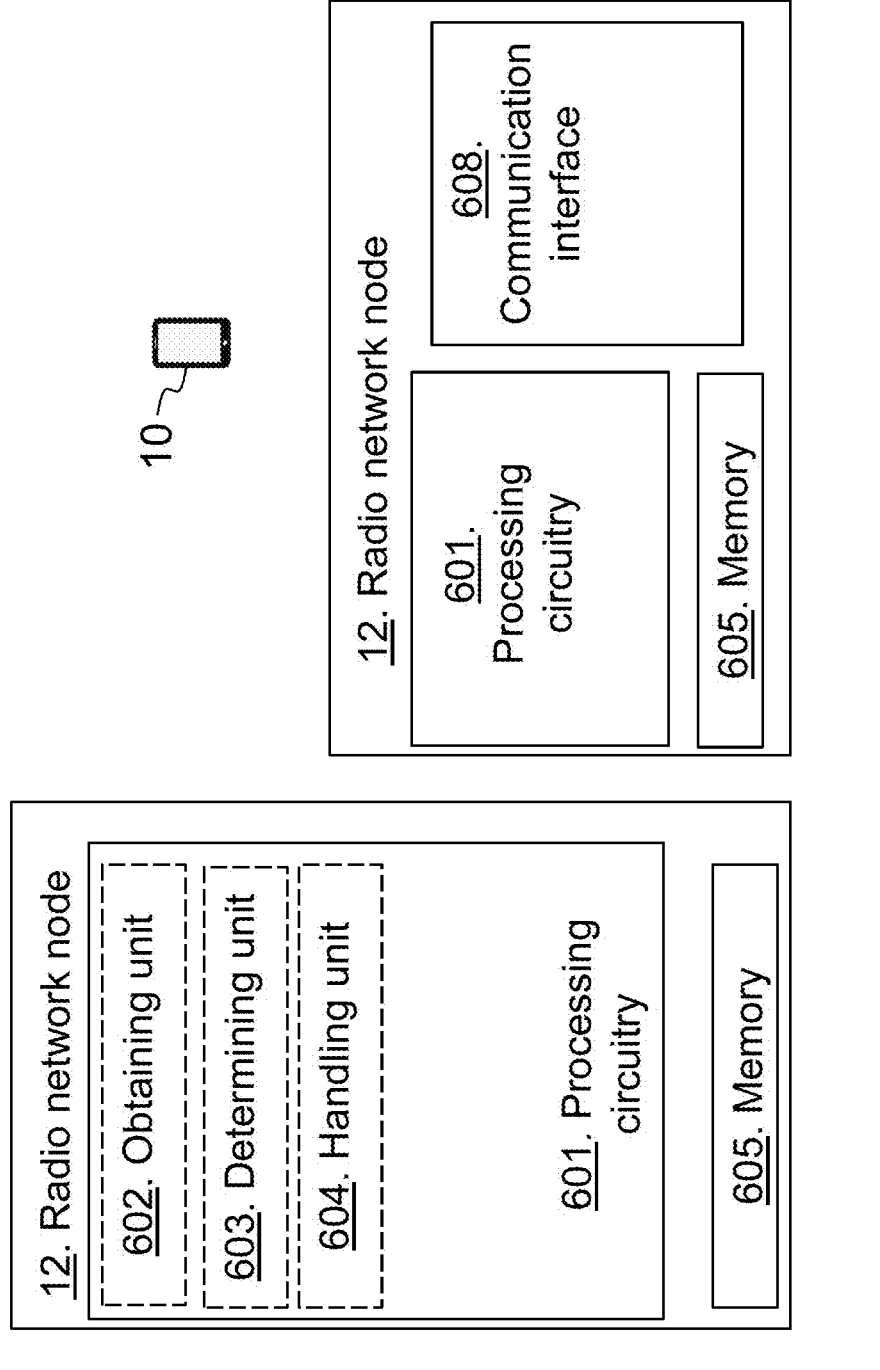
FIG. 6 shows a block diagram depicting embodiments of a radio network node according to embodiments herein.

FIG. 6 is a block diagram depicting the radio network node 12 for handling communication in the wireless communications network 1 according to embodiments herein.

The radio network node 12 may comprise processing circuitry 601, e.g., one or more processors, configured to perform the methods herein.

The radio network node 12 may comprise an obtaining unit 602, e.g., a receiver or a transceiver. The radio network node 12, the processing circuitry 601 and/or the obtaining unit 602 is configured to obtain the one or more indications the UE 10 or another network node, indicating, explicitly or implicitly, the processing time for handling segments of the RRC message at the UE 10. The one or more indications may comprise the one or more values or parameters used to estimate the processing time. The one or more indications may comprise one or more values of one or more parameters for determining the processing time. The one or more indications may define a value, a time value or parameters used to estimate the processing time. The one or more indications may comprise the respective value or parameter for the respective radio access technology used or respective dual connectivity option used. The one or more indications may indicate the first processing time indication for the wireless communications network, independently of one or more indications for the second processing time indication for the other wireless communications network. The radio network node 12, the processing circuitry 601 and/or the obtaining unit 602 may be configured to obtain different values for different RATs for the UE, a different supported value for each DC option at the UE 10, different indications related to different networks e.g., different public land mobile networks. The radio network node 12, the processing circuitry 601 and/or the obtaining unit 602 may be configured to obtain or receive another indication that the UE 10 is able to support different processing delay requirements, i.e., support different processing times.

The radio network node 12 may comprise a determining unit 603. The radio network node 12, the processing circuitry 601 and/or the determining unit 603 is configured to determine the processing time for handling the segments of the RRC message at the UE 10 based on the one or more indications. The radio network node 12, the processing circuitry 601 and/or the determining unit 603 may be configured to estimate the processing time based on values indicated by the one or more indications.

The radio network node 12 may comprise a handling unit 604. The radio network node 12, the processing circuitry 601 and/or the handling unit 604 may be configured to handle segments of the RRC message and/or resources related to the RRC message based on the determined processing time at the UE. The radio network node 12, the processing circuitry 601 and/or the handling unit 604 may be configured to handle the resources related to the RRC message, when the response message is triggered in response to applying the RRC message, by providing transmission resources in time so that the UE can send the response at the end of the processing time. Thus, the radio network node 12, the processing circuitry 601 and/or the handling unit 604 may be configured to assume that the UE 10 will, in response to sending a segmented RRC message to the UE, have applied the RRC message after the processing time. And in case the response message is triggered in response to applying the RRC message, the radio network node 12, the processing circuitry 601 and/or the handling unit 604 may be configured to provide transmission resources for the UE 10 such that the UE 10 can send the response message.

The radio network node 12 may comprise a memory 605. The memory 605 comprises one or more units to be used to store data on, such as data packets, processing times information or formulas, resource information, RRC messages, events and applications to perform the methods disclosed herein when being executed, and similar. Furthermore, the radio network node 12 may comprise a communication interface 608 such as comprising a transmitter, a receiver, a transceiver and/or one or more antennas.

The methods according to the embodiments described herein for the radio network node 12 are respectively implemented by means of, e.g., a computer program product 606 or a computer program, comprising instructions, i.e., software code portions, which, when executed on at least one processor, cause the at least one processor to carry out the actions described herein, as performed by the radio network node 12. The computer program product 606 may be stored on a computer-readable storage medium 607, e.g., a disc, a universal serial bus (USB) stick or similar. The computer-readable storage medium 607, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium. Thus, embodiments herein may disclose a radio network node 12 for handling communication in a wireless communications network, wherein the radio network node 12 comprises processing circuitry and a memory, said memory comprising instructions executable by said processing circuitry whereby said radio network node 12 is operative to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multistandard radio (MSR) radio node such as MSR BS, eNodeB, gNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 7:
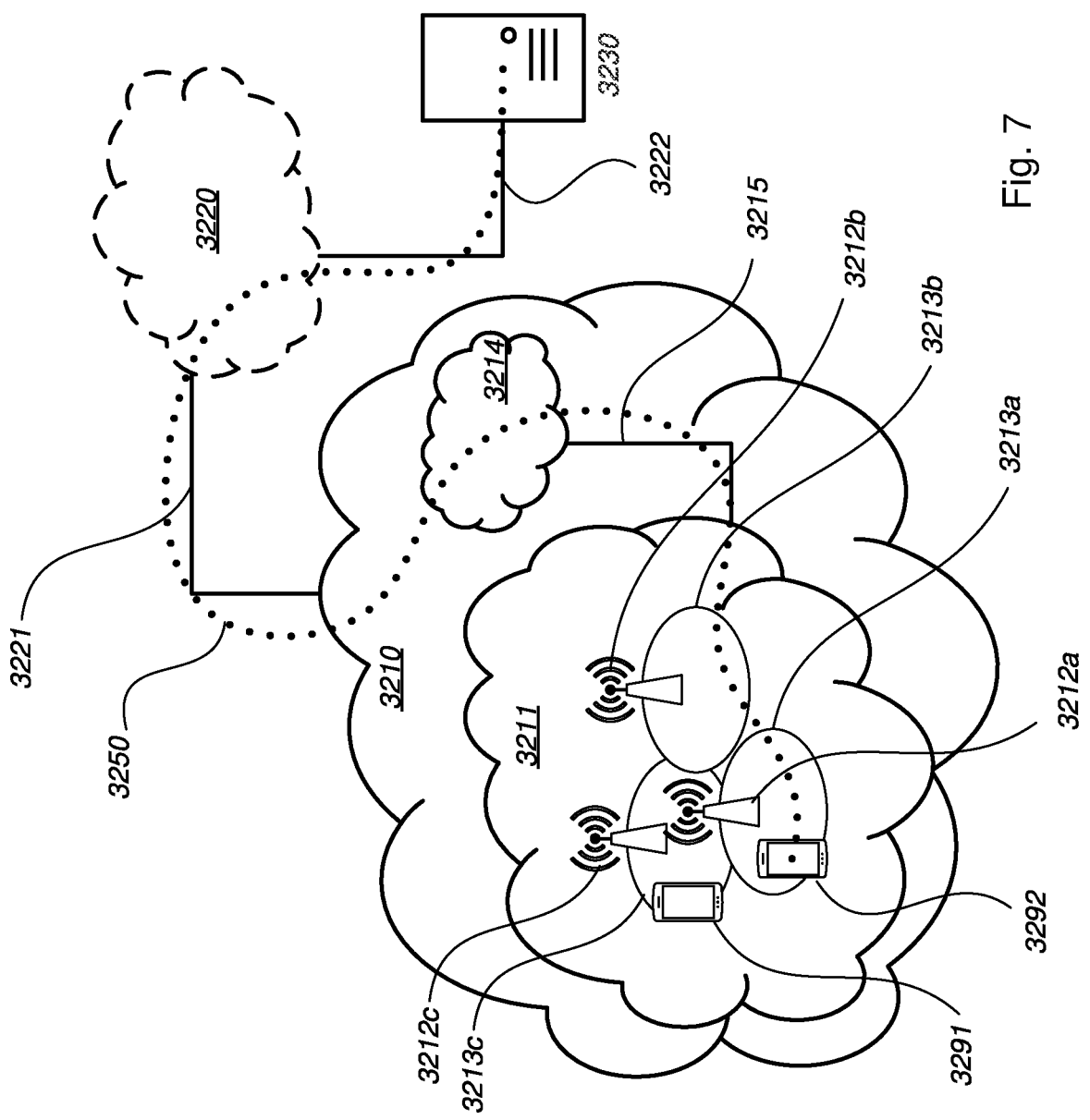
FIG. 7 schematically illustrates a telecommunication network connected via an intermediate network to a host computer.

With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the UE 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
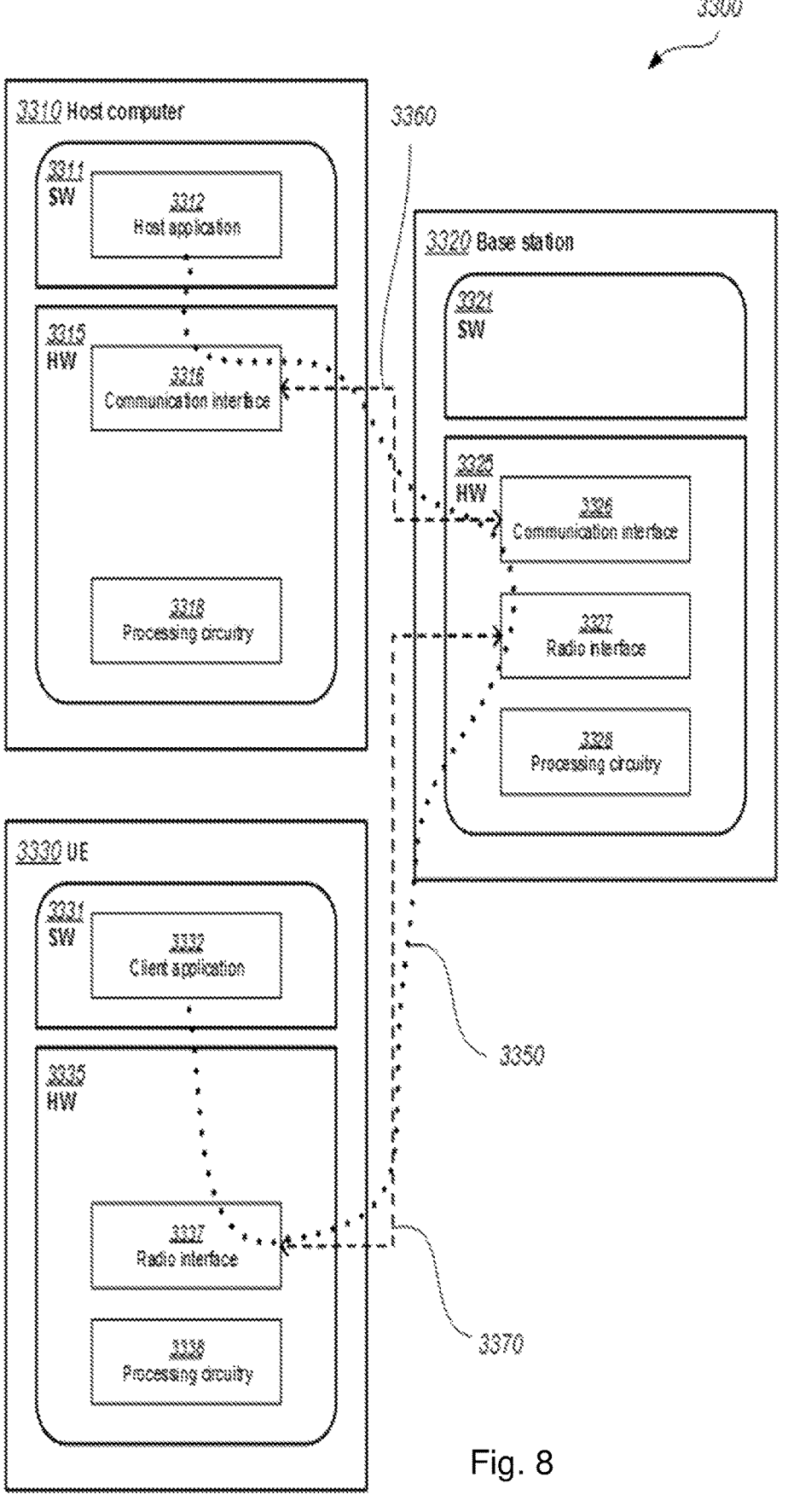
FIG. 8 is a generalized block diagram of a host computer communicating via a base station with a user equipment over a partially wireless connection.

It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since radio resource may be handled based on the processing time and thereby handled more efficiently and hence provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 9:
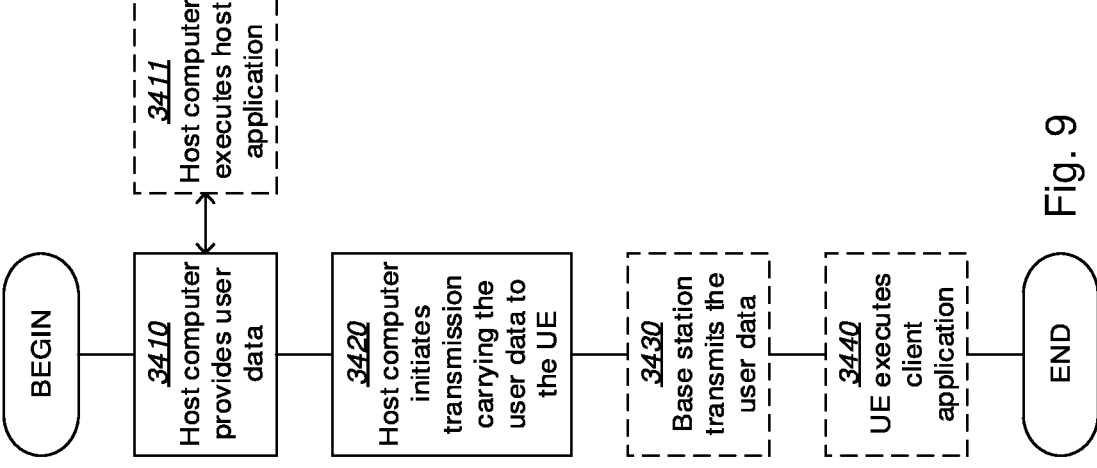

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 10:
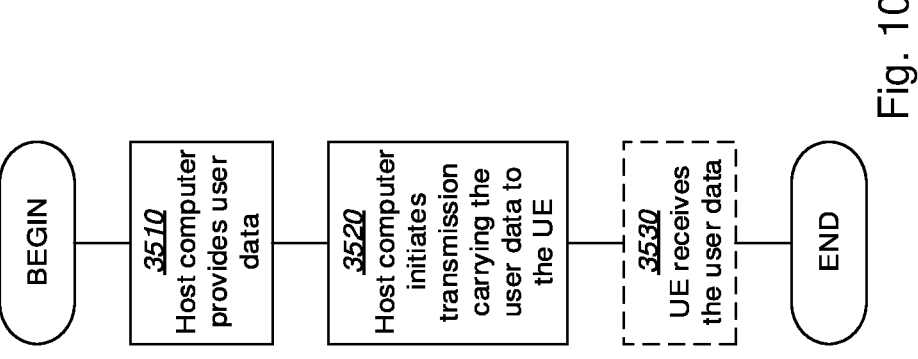
FIGS. 9, 10, 11, and 12 are flowcharts illustrating methods implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 11:
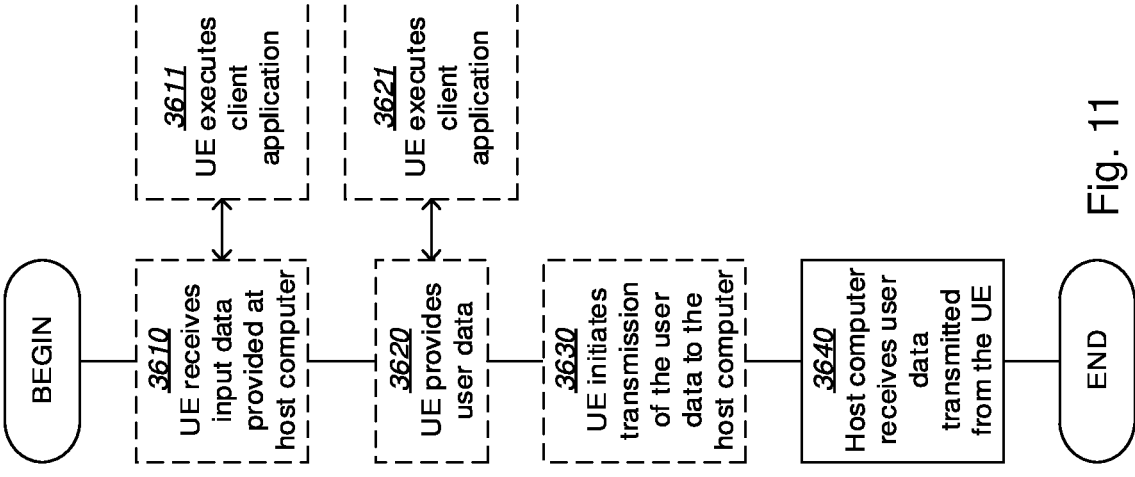

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 12:
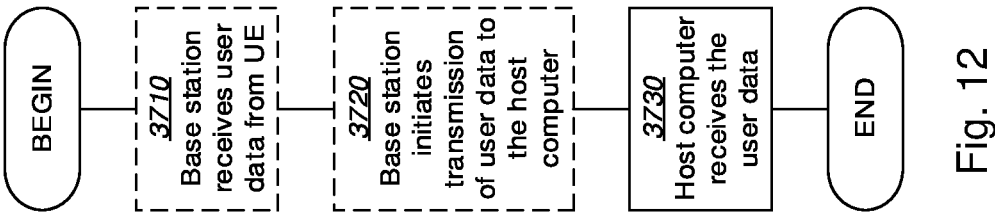

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment (UE) for handling communication in a wireless communications network, the method comprising:
   determining a processing time for handling segments of a Radio Resource Control (RRC) message;
   transmitting, to a radio network node, one or more indications indicating, explicitly or implicitly, the processing time for handling segments of the RRC message;
   wherein the indicated processing time is based on a minimum possible number of segments to send the RRC message or based on a size of the RRC message.

2. The method of claim 1, wherein the one or more indications comprise one or more values or parameters for determining the processing time.

3. The method of claim 1, wherein the one or more indications indicate a value to process one additional segment of the segmented RRC message.

4. The method of claim 1, wherein the one or more indications comprise a respective value or parameter for a respective radio access technology used or a respective dual connectivity option used.

5. The method of claim 1, wherein the one or more indications indicate a first processing time indication for the wireless communications network, independently of one or more indications for a second processing time indication for another wireless communications network.

6. The method of claim 1, further comprising transmitting another indication indicating that the UE is able to support different processing delay requirements.

7. A method performed by a radio network node for handling communication in a wireless communications network, the method comprising:
   obtaining one or more indications from a user equipment (UE) or another network node, indicating, explicitly or implicitly, a processing time for handling segments of a radio resource control (RRC) message at the UE; and determining the processing time for handling the segments of the RRC message at the UE based on the one or more indications.

8. The method of claim 7, wherein the one or more indications comprise one or more values or parameters used to estimate the processing time.

9. The method of claim 7, wherein the one or more indications comprise a respective value or parameter for respective radio access technology used or respective dual connectivity option used.

10. The method of claim 7, wherein the one or more indications indicate a first processing time indication for the wireless communications network, independently of one or more indications for a second processing time indication for another wireless communications network.

11. The method of claim 7, further comprising receiving another indication indicating that the UE is able to support different processing delay requirements.

12. The method of claim 7, further comprising handling segments of the RRC message or resources related to the RRC message based on the determined processing time at the UE, wherein said handling the resources related to the RRC message comprises, when a response message is triggered in response to applying the RRC message, providing transmission resources in time so that the UE can send the response at the end of the processing time.

13. A user equipment (UE) for handling communication in a wireless communications network, wherein the UE is configured to:

determine a processing time for handling segments of a Radio Resource Control (RRC) message;

transmit, to a radio network node, one or more indications indicating, explicitly or implicitly, the processing time for handling segments of the RRC message;

wherein the indicated processing time is based on a minimum possible number of segments to send the RRC message or based on a size of the RRC message.

14. A radio network node for handling communication in a wireless communications network, wherein the radio network node is configured to:

obtain one or more indications from a user equipment (UE) or another network node, indicating, explicitly or implicitly, a processing time for handling segments of a radio resource control (RRC) message at the UE; and determine the processing time for handling the segments of the RRC message at the UE based on the one or more indications.

15. The radio network node of claim 14, wherein the radio network node is configured to handle segments of the RRC message or resources related to the RRC message based on the determined processing time at the UE.

16. The radio network node of claim 15, wherein the radio network node is configured to handle the resources related to the RRC message, when a response message is triggered in response to applying the RRC message, by providing transmission resources in time so that the UE can send the response at the end of the processing time.

* * * * *